(12) United States Patent
Tan

(10) Patent No.: US 10,934,982 B1
(45) Date of Patent: Mar. 2, 2021

(54) AIR COOLING CHAMBER ASSEMBLY AND INTERNAL COMBUSTION ENGINE HAVING THE SAME

(71) Applicant: EcoDrive Inc., Johns Creek, GA (US)

(72) Inventor: Hwee Teng Tan, Johns Creek, GA (US)

(73) Assignee: EcoDrive Inc., Johns Creek, GA (US)

( * ) Notice: Subject to any disclaimer, the term of this patent is extended or adjusted under 35 U.S.C. 154(b) by 0 days.

(21) Appl. No.: 16/816,102

(22) Filed: Mar. 11, 2020

(51) Int. Cl.
| | |
|---|---|
| *F28D 1/00* | (2006.01) |
| *F01P 3/22* | (2006.01) |
| *F02M 35/10* | (2006.01) |
| *F01P 9/06* | (2006.01) |
| *F01P 1/06* | (2006.01) |

(52) U.S. Cl.
CPC ......... *F02M 35/10268* (2013.01); *F01P 1/06* (2013.01); *F01P 9/06* (2013.01); *F02M 35/10144* (2013.01)

(58) Field of Classification Search
CPC .......... F28D 2021/0085; F28D 1/05366; F01P 2060/02; F01P 3/22; F02M 31/20; F02M 26/30; F02M 35/10268
See application file for complete search history.

(56) References Cited

U.S. PATENT DOCUMENTS

| | | | | |
|---|---|---|---|---|
| 6,182,741 B1* | 2/2001 | Yoshii | ............... | B60H 1/3229 |
| | | | | 165/134.1 |
| 9,464,599 B2* | 10/2016 | Choi | ............... | F02B 29/0475 |
| 2003/0010488 A1* | 1/2003 | Watanabe | ............ | F28D 1/0408 |
| | | | | 165/202 |
| 2008/0087402 A1* | 4/2008 | Burk | ............... | F02M 35/10222 |
| | | | | 165/101 |
| 2011/0314805 A1* | 12/2011 | Seale | ............... | F02G 1/0435 |
| | | | | 60/522 |
| 2016/0138871 A1* | 5/2016 | Matsumoto | ............ | F28F 9/262 |
| | | | | 165/143 |

* cited by examiner

*Primary Examiner* — Long T Tran
(74) *Attorney, Agent, or Firm* — Ming Jiang; MM IP Services LLC

(57) ABSTRACT

Present disclosure relates to air cooling chamber assembly. The air cooling chamber assembly includes: an air intake duct receiving ambient air outside of an internal combustion engine, an air cooling chamber cooling the ambient air received from the air intake duct to generate cooled air, and an air output duct providing the cooled air generated from the air cooling chamber to the internal combustion engine. The air cooling chamber assembly is connected to engine air intake of the internal combustion engine to cool the ambient air to generate the cooled air prior to entering the internal combustion engine, and to provide the cooled air generated to engine air intake of the internal combustion engine. The cooled air from air cooling chamber contains increased amount of oxygen molecules, and increased amount of oxygen molecules in the cooled air improves fuel efficiency and reduces greenhouse gas emission of the internal combustion engine.

20 Claims, 4 Drawing Sheets

TABLE 1: BENCHMARK AVERAGE FUEL CONSUMPTION FOR A TEST VEHICLE

| MONTHS | TOTAL DISTANCE TRAVELED (KM) | TOTAL FUEL CONSUMPTION (L) | AVERAGE FUEL COMSUMPTION (KM/L) |
|---|---|---|---|
| April, 2019 | 4,716 | 2,776 | 1.70 |
| May, 2019 | 7,408 | 3,851 | 1.92 |
| June, 2019 | 6,818 | 3,333 | 2.05 |
| July, 2019 | 8,704 | 4,245 | 2.05 |
| August, 2019 | 5,044 | 2,644 | 1.91 |
| WEIGHTED AVERAGE | | | 1.95 |

FIG. 4

TABLE 2: BENCHMARK AVERAGE FUEL CONSUMPTION FOR THE TEST VEHICLE HAVING AIR COOLING CHAMBER ASSEMBLY

| MONTHS | TOTAL DISTANCE TRAVELED (KM) | TOTAL FUEL CONSUMPTION (L) | AVERAGE FUEL COMSUMPTION (KM/L) |
|---|---|---|---|
| September, 2019 | 4,467 | 2,108 | 2.12 |
| October, 2019 | 10,143 | 4,373 | 2.32 |
| November, 2019 | 6,594 | 3,049 | 2.18 |
| WEIGHTED AVERAGE | | | 2.23 |

FIG. 5

AIR COOLING CHAMBER ASSEMBLY AND INTERNAL COMBUSTION ENGINE HAVING THE SAME

FIELD

The present disclosure generally relates to the field of internal combustion engine, and more particularly to air cooling chamber assemblies to increase intake ambient air density and oxygen molecules to improve fuel efficiency of the internal combustion engines, and the internal combustion engines having the air cooling chamber assemblies.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engine uses energy by burning the mixture of fuel and air to produce power. In order to improve fuel consumption rate of the internal combustion engine, many engines employ turbocharger, in which the power of the exhaust gas turns the turbine that is mechanically connected to an air-blower for supplying and compressing the filtered intake ambient air into the engine. The objective of a turbocharger is to improve an engine's efficiency by increasing the density of the intake air by compressing the intake air before the intake air enters the intake manifold of the internal combustion engine. This results in a greater mass of air entering the cylinders on each intake stroke thereby allowing more power per engine cycle. However, temperature of the pressurized air or charge air can rise as high as 150° C., as a result, the density of the charge air will be reduced. This affects the performance of the original intention to improve the fuel efficiency.

Therefore, an unaddressed need exists in the art to address the aforementioned deficiencies and inadequacies.

SUMMARY

In one aspect, the present disclosure relates to an air cooling chamber assembly. In certain embodiments, the air cooling chamber assembly includes: an air intake duct, an air cooling chamber, and an air output duct. The air intake duct receives ambient air outside of an internal combustion engine. The air cooling chamber cools the ambient air received from the air intake duct to generate cooled air. The air output duct provides the cooled air generated from the air cooling chamber to the internal combustion engine.

In certain embodiments, the air cooling chamber assembly is connected to an engine air intake of the internal combustion engine to cool the ambient air to generate the cooled air prior to entering the internal combustion engine, and to provide the cooled air generated to the engine air intake of the internal combustion engine.

In certain embodiments, the air intake duct includes: a first end, and an opposite, second end. The first end receives the ambient air. The second end provides the ambient air to the air cooling chamber.

In certain embodiments, the air output duct includes: a first end, and an opposite, second end. The first end receives the cooled air from the air cooling chamber. The second end provides the cooled air received to the engine air intake of the internal combustion engine.

In certain embodiments, the air output duct is shielded by one or more thermal shield materials to maintain low temperature of the cooled air in an engine compartment of the internal combustion engine.

In certain embodiments, the air cooling chamber includes an evaporator. The evaporator includes: an array of fins and a gaseous refrigerant tube. The gaseous refrigerant tube has a first end and a second end. The first end of the gaseous refrigerant tube is connected to a low pressure line of a cooling device to receive a gaseous refrigerant. The second end of the gaseous refrigerant tube is connected to an input of a compressor of the cooling device. The evaporator cools the ambient air passing through the air cooling chamber to generate the cooled air.

In certain embodiments, air density of the cooled air from the air cooling chamber is increased due to a cooling process inside the air cooling chamber assembly. High density cooled air from the air cooling chamber includes increased amount of oxygen molecules, and the increased amount of oxygen molecules in the high density cooled air improves the fuel efficiency and reduces greenhouse gas emission of the internal combustion engine.

In another aspect, the present disclosure relates to an internal combustion engine. In certain embodiments, the internal combustion engine includes an air cooling chamber assembly. The air cooling chamber assembly includes: an air intake duct, an air cooling chamber, and an air output duct. The air intake duct receives ambient air outside of the internal combustion engine. The air cooling chamber cools the ambient air received from the air intake duct to generate cooled air. The air output duct provides the cooled air generated from the air cooling chamber to the internal combustion engine.

In certain embodiments, the air cooling chamber assembly is connected to an engine air intake of the internal combustion engine to cool the ambient air to generate the cooled air prior to entering the internal combustion engine, and to provide the cooled air generated to the engine air intake of the internal combustion engine.

In certain embodiments, the air intake duct includes: a first end, and an opposite, second end. The first end receives the ambient air. The second end provides the ambient air to the air cooling chamber.

In certain embodiments, the air output duct includes: a first end, and an opposite, second end. The first end receives the cooled air from the air cooling chamber. The second end provides the cooled air received to the engine air intake of the internal combustion engine.

In certain embodiments, the air output duct is shielded by one or more thermal shield materials to maintain low temperature of the cooled air in an engine compartment of the internal combustion engine.

In certain embodiments, the air cooling chamber includes an evaporator. The evaporator includes: an array of fins and a gaseous refrigerant tube. The gaseous refrigerant tube has a first end and a second end. The first end of the gaseous refrigerant tube is connected to a low pressure line of a cooling device to receive a gaseous refrigerant. The second end of the gaseous refrigerant tube is connected to an input of a compressor of the cooling device. The evaporator cools the ambient air passing through the air cooling chamber to generate the cooled air.

In certain embodiments, air density of the cooled air from the air cooling chamber is increased due to a cooling process inside the air cooling chamber assembly. High density cooled air from the air cooling chamber includes increased amount of oxygen molecules, and the increased amount of oxygen molecules in the high density cooled air improves the fuel efficiency and reduces greenhouse gas emission of the internal combustion engine.

In yet another aspect, the present disclosure relates to an internal combustion engine of an automobile. In certain embodiments, the internal combustion engine of the automobile includes an air cooling chamber assembly. The air cooling chamber assembly includes: an air intake duct, an air cooling chamber, and an air output duct. The air intake duct receives ambient air outside of the internal combustion engine of the automobile. The air cooling chamber cools the ambient air received from the air intake duct to generate cooled air. The air output duct provides the cooled air generated from the air cooling chamber to the internal combustion engine.

In certain embodiments, the air cooling chamber assembly is connected to an engine air intake of the internal combustion engine of the automobile to cool the ambient air to generate the cooled air prior to entering the internal combustion engine of the automobile, and to provide the cooled air generated to the engine air intake of the internal combustion engine of the automobile.

In certain embodiments, the air intake duct includes: a first end, and an opposite, second end. The first end receives the ambient air. The second end provides the ambient air to the air cooling chamber.

In certain embodiments, the air output duct includes: a first end, and an opposite, second end. The first end receives the cooled air from the air cooling chamber. The second end provides the cooled air received to the engine air intake of the internal combustion engine of the automobile.

In certain embodiments, the air output duct is shielded by one or more thermal shield materials to maintain low temperature of the cooled air in an engine compartment of the internal combustion engine of the automobile.

In certain embodiments, the air cooling chamber includes an evaporator. The evaporator includes: an array of fins and a gaseous refrigerant tube. The gaseous refrigerant tube has a first end and a second end. The first end of the gaseous refrigerant tube is connected to a low pressure line of an air conditioner of the automobile to receive a gaseous refrigerant. The second end of the gaseous refrigerant tube is connected to an input of a compressor of the air conditioner of the automobile. The evaporator cools the ambient air passing through the air cooling chamber to generate the cooled air.

In certain embodiments, air density of the cooled air from the air cooling chamber is increased due to a cooling process inside the air cooling chamber assembly. High density cooled air from the air cooling chamber includes increased amount of oxygen molecules, and the increased amount of oxygen molecules in the high density cooled air improves the fuel efficiency and reduces greenhouse gas emission of the internal combustion engine of the automobile.

These and other aspects of the present disclosure will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the disclosure and, together with the written description, serve to explain the principles of the disclosure. Wherever possible, the same reference numbers are used throughout the drawings to refer to the same or like elements of an embodiment. The drawings do not limit the present disclosure to the specific embodiments disclosed and described herein. The drawings are not necessarily to scale, emphasis instead being placed upon clearly illustrating the principles of the disclosure, and wherein:

FIG. 4 is a table showing a benchmark average fuel consumption of a test vehicle without an air cooling chamber assembly according to certain embodiments of the present disclosure; and FIG. 5 is a table showing average fuel consumption of the same test vehicle having an air cooling chamber assembly installed according to certain embodiments of the present disclosure.

DETAILED DESCRIPTION

Figure 1:
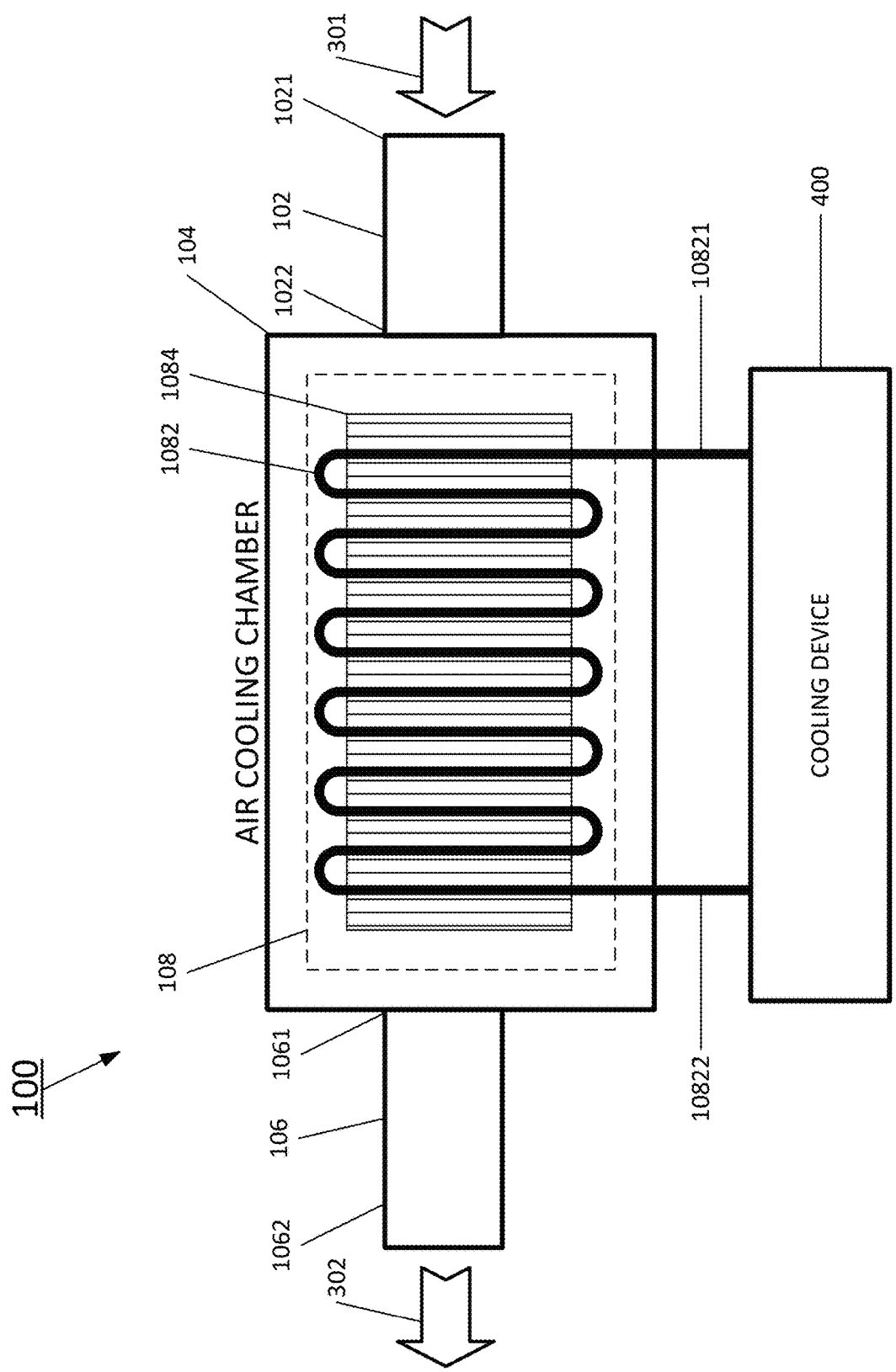
FIG. 1 illustrates an air cooling chamber assembly according to certain embodiments of the present disclosure.

The present disclosure will now be described more fully hereinafter with reference to the accompanying drawings, in which exemplary embodiments of the disclosure are shown. This disclosure may, however, be embodied in many different forms and should not be construed as limited to the embodiments set forth herein. Rather, these embodiments are provided so that this disclosure will be thorough and complete, and will fully convey the scope of the disclosure to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," or "includes" and/or "including" or "has" and/or "having" when used herein, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom", "upper" or "top," and "front" or "back" may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximates, meaning that the term "around", "about" or "approximately" can be inferred if not expressly stated.

Many specific details are provided in the following descriptions to make the present disclosure be fully understood, but the present disclosure may also be implemented by using other manners different from those described herein, so that the present disclosure is not limited by the specific embodiments disclosed in the following.

The description will be made as to the embodiments of the present disclosure in conjunction with the accompanying drawings FIGS. 1 through 3.

In one aspect, the present disclosure relates to an air cooling chamber assembly 100. In certain embodiments, as shown in FIG. 1, the air cooling chamber assembly 100 is an add-on to an internal combustion engine to reduce temperature of incoming ambient air, increase oxygen molecules in cooled air, and improve fuel efficiency of the internal combustion engine. The air cooling chamber assembly 100 includes: an air intake duct 102, an air cooling chamber 104, and an air output duct 106. The air intake duct 102 receives ambient air 301 outside of an internal combustion engine 200. The air cooling chamber 104 cools the ambient air 301 received from the air intake duct 102 to generate cooled air 302. The air output duct 106 provides the cooled air 302 generated from the air cooling chamber 104 to the internal combustion engine 200.

In certain embodiments, the air cooling chamber 104 includes an evaporator 108. The evaporator 108 includes: an array of fins 1084 and a gaseous refrigerant tube 1082. The gaseous refrigerant tube 1082 has a first end 10821 and a second end 10822. The first end 10821 of the gaseous refrigerant tube 1082 is connected to a low pressure line of a cooling device 400 to receive a gaseous refrigerant. The second end 10822 of the gaseous refrigerant tube 1082 is connected to an input of a compressor of the cooling device 400. The evaporator 108 cools the ambient air 301 passing through the air cooling chamber 104 to generate the cooled air 302. In certain embodiments, the cooling device 400 includes a separate compressor based cooling system.

Figure 2:
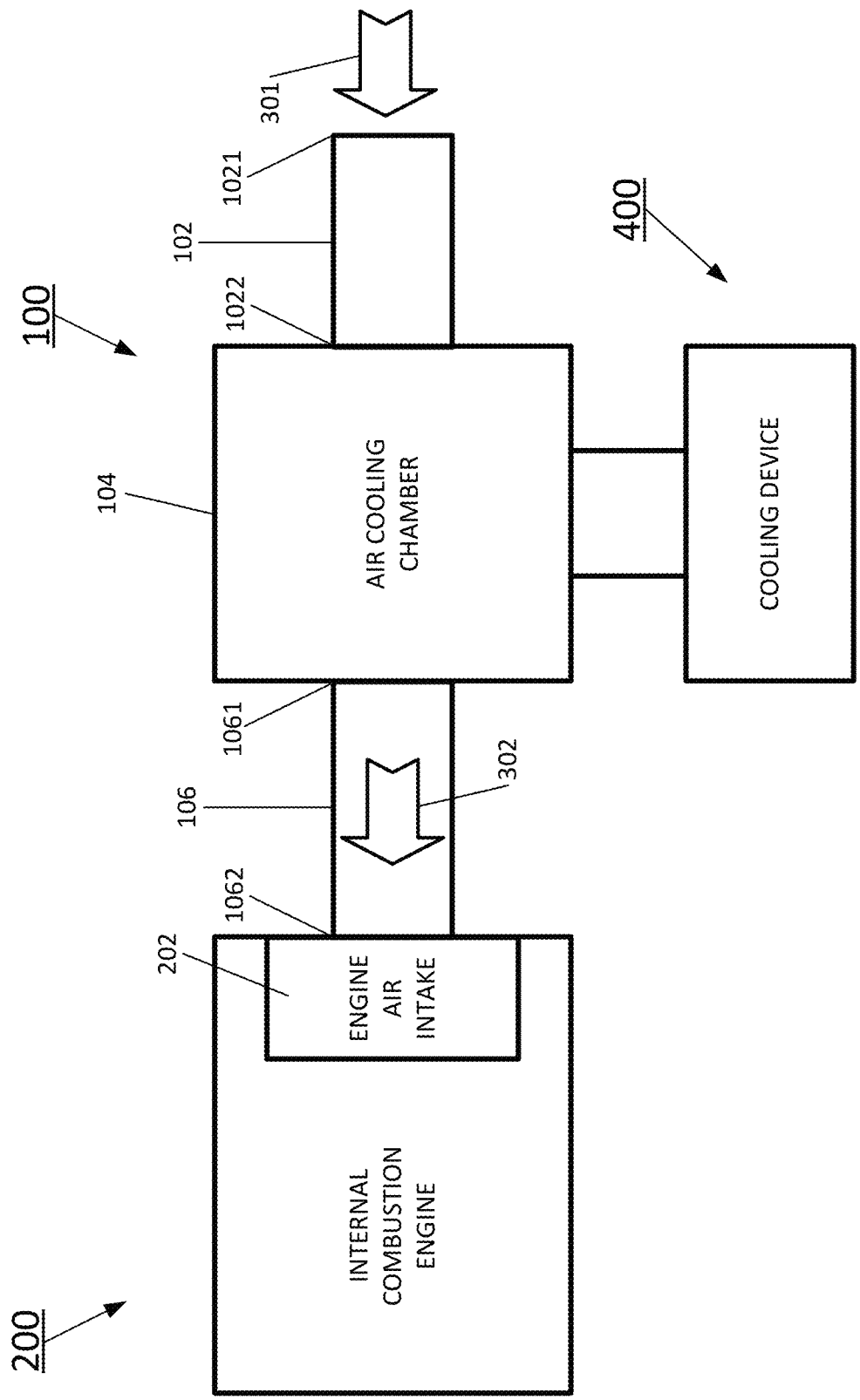
FIG. 2 illustrates an air cooling chamber assembly for an internal combustion engine according to certain embodiments of the present disclosure.

Referring now to FIG. 2, in certain embodiments, the air intake duct 102 includes: a first end 1021, and an opposite, second end 1022. The first end 1021 receives the ambient air 301. The second end 1022 provides the ambient air 301 to the air cooling chamber 104.

In certain embodiments, the air output duct 106 includes: a first end 1061, and an opposite, second end 1062. The first end 1061 receives the cooled air 302 from the air cooling chamber 104. The second end 1062 provides the cooled air 302 received to an engine air intake 202 of the internal combustion engine 200.

In certain embodiments, the air cooling chamber assembly 100 is connected to the engine air intake 202 of the internal combustion engine 200 to cool the ambient air 301 to generate the cooled air 302 prior to entering the internal combustion engine 200, and to provide the cooled air 302 generated to the engine air intake 202 of the internal combustion engine 200.

In certain embodiments, the air output duct 106 is shielded by one or more thermal shield materials to shield the heat from the internal combustion engine 200 and maintain low temperature of the cooled air 302 in an engine compartment of the internal combustion engine 200. In certain embodiments, the thermal shield materials include thermal sleeving, thermal barriers, and/or thermal wraps. In other embodiments, the thermal shield materials include solid steel heat shield, aluminum heat shield, and/or ceramic thermal barrier coated heat insulation materials. These thermal shield materials are very important, and the air cooling chamber assembly 100 may not work as effectively as designed without these thermal shield materials.

In certain embodiments, air density of the cooled air 302 from the air cooling chamber 104 is increased due to a cooling process inside the air cooling chamber assembly 100. High density cooled air 302 from the air cooling chamber 104 contains increased amount of oxygen molecules, and these increased amount of oxygen molecules in the high density cooled air 302 improves the fuel efficiency of the internal combustion engine 200.

In another aspect, the present disclosure relates to an internal combustion engine 200. In certain embodiments, as shown in FIG. 2, the internal combustion engine 200 includes an air cooling chamber assembly 100. The air cooling chamber assembly 100 includes: an air intake duct 102, an air cooling chamber 104, and an air output duct 106. The air intake duct 102 has a first end 1021 and a second end 1022, and the air intake duct 102 receives ambient air 301 at the first end 1021 outside of the internal combustion engine 200. The air cooling chamber 104 receives the ambient air 301 from the second end 1022 of the air intake duct 102, and cools the ambient air 301 received from the air intake duct 102 to generate cooled air 302. The air output duct 106 has a first end 1061 and a second end 1062, and the first end 1061 of the air output duct 106 receives the cooled air 302 from the air cooling chamber 104 and provides the cooled air 302 generated from the air cooling chamber 104 to the internal combustion engine 200 at the second end 1062 of the air output duct 106.

In certain embodiments, the air cooling chamber assembly 100 is connected to an engine air intake 202 of the internal combustion engine 200 to cool the ambient air 301 to generate the cooled air 302 prior to entering the internal combustion engine 200, and to provide the cooled air 302 generated to the engine air intake 202 of the internal combustion engine 200.

In certain embodiments, the air output duct 106 is shielded by one or more thermal shield materials to shield the heat from the internal combustion engine 200 and maintain low temperature of the cooled air 302 in an engine compartment of the internal combustion engine 200. In certain embodiments, the thermal shield materials include thermal sleeving, thermal barriers, and/or thermal wraps. In other embodiments, the thermal shield materials include solid steel heat shield, aluminum heat shield, and/or ceramic thermal barrier coated heat insulation materials. These thermal shield materials are very important, and the air cooling chamber assembly 100 may not work as effectively as designed without these thermal shield materials.

In certain embodiments, the air cooling chamber 104, as shown in FIG. 1, includes an evaporator 108. The evaporator 108 includes: an array of fins 1084 and a gaseous refrigerant tube 1082. The gaseous refrigerant tube 1082 has a first end 10821 and a second end 10822. The first end 10821 of the gaseous refrigerant tube 1082 is connected to a low pressure line of a cooling device 400 to receive a gaseous refrigerant. The second end 10822 of the gaseous refrigerant tube 1082 is connected to an input of a compressor of the cooling device 400. The evaporator 108 cools the ambient air 301 passing through the air cooling chamber 104 to generate the cooled air 302.

In one embodiment, the cooling device 400 is a separate compressor based cooling system. The compressor based cooling system includes a compressor for compressing the gaseous refrigerant resides in the system into a high temperature, high pressure gaseous refrigerant. The high temperature, high pressure gaseous refrigerant passes through a compressor's outlet and travels through a high-pressure lines to a condenser. The condenser is similar to a small radiator, and through a heat exchanging process with atmospheric air, the high temperature, high pressure gaseous refrigerant is liquefied. The liquefy refrigerant then flows into an expansion valve where it is restricted and becomes low temperature gaseous refrigerant. The low temperature gaseous refrigerant is now able to absorb heat from the air passing through an evaporator fins, leaving behind the cooler air 302. A cooled air fan may be used to blow the cool air 302 into the internal combustion engine's engine air intake 202 through the second end 1062 of the air output duct 106.

In certain embodiments, air density of the cooled air 302 from the air cooling chamber 104 is increased due to a cooling process inside the air cooling chamber assembly 100. High density cooled air 302 from the air cooling chamber 104 contains increased amount of oxygen molecules, and the increased amount of oxygen molecules in the high density cooled air 302 improves the fuel efficiency and reduces greenhouse gas emission of the internal combustion engine 200.

In yet another aspect, the present disclosure relates to an internal combustion engine 200 of an automobile. In certain embodiments, as shown in FIG. 3, the internal combustion engine 200 of the automobile includes an air cooling chamber assembly 100. The air cooling chamber assembly 100, as shown in FIG. 1 and FIG. 2, includes: an air intake duct 102, an air cooling chamber 104, and an air output duct 106. The air intake duct 102 receives ambient air 301 outside of the internal combustion engine 200 of the automobile. The air cooling chamber 104 cools the ambient air 301 received from the air intake duct 102 to generate cooled air 302. The air output duct 106 provides the cooled air 302 generated from the air cooling chamber 104 to the internal combustion engine 200 of the automobile.

In certain embodiments, the air cooling chamber assembly 100 is connected to an engine air intake 202 of the internal combustion engine 200 of the automobile to cool the ambient air 301 to generate the cooled air 302 prior to entering the internal combustion engine 200 of the automobile, and to provide the cooled air 302 generated to the engine air intake 202 of the internal combustion engine 200 of the automobile.

In certain embodiments, the air intake duct 102 includes: a first end 1021, and an opposite, second end 1022. The first end 1021 receives the ambient air 301. The second end 1022 provides the ambient air 301 to the air cooling chamber 104.

In certain embodiments, the air output duct 106 includes: a first end 1061, and an opposite, second end 1062. The first end 1061 receives the cooled air 302 from the air cooling chamber 104. The second end 1062 provides the cooled air 302 received to the engine air intake 202 of the internal combustion engine 200 of the automobile.

In certain embodiments, the air output duct 106 is shielded by one or more thermal shield materials to shield the heat from the internal combustion engine 200 and maintain low temperature of the cooled air 302 in an engine compartment of the internal combustion engine 200. In certain embodiments, the thermal shield materials include thermal sleeving, thermal barriers, and/or thermal wraps. In other embodiments, the thermal shield materials include solid steel heat shield, aluminum heat shield, and/or ceramic thermal barrier coated heat insulation materials. These thermal shield materials are very important, and the air cooling chamber assembly 100 may not work as effectively as designed without these thermal shield materials.

Figure 3:
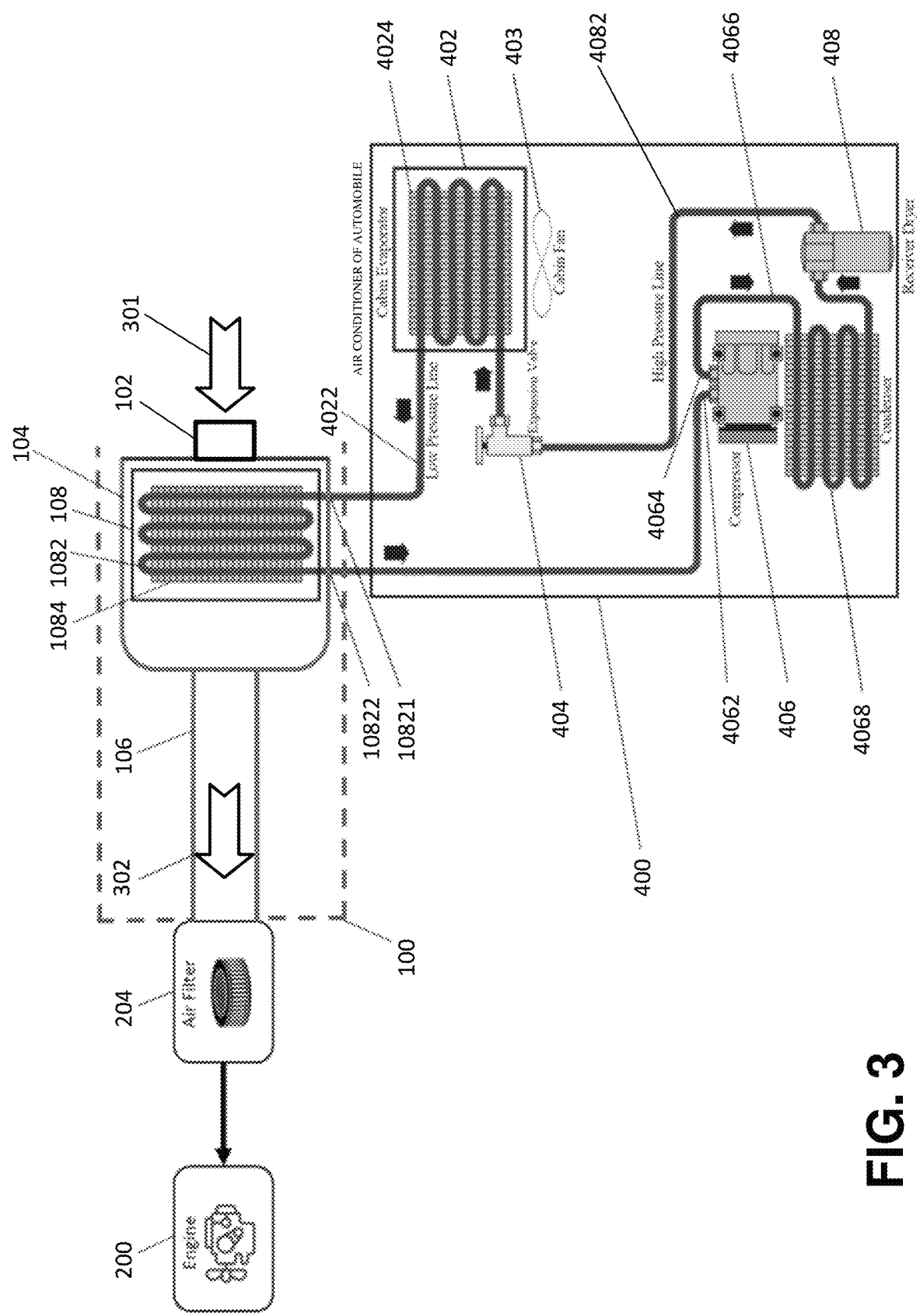
FIG. 3 illustrates an air cooling chamber assembly for an internal combustion engine of an automobile according to certain embodiments of the present disclosure.

In certain embodiments, the air cooling chamber 104, as shown in FIG. 3, includes an evaporator 108. The evaporator 108 includes: an array of fins 1084 and a gaseous refrigerant tube 1082. The gaseous refrigerant tube 1082 has a first end 10821 and a second end 10822. Its cooling device is an integral part of an air conditioner 400 of the automobile. The gaseous refrigerant tube 1082 is serially connected to a low pressure line of the air conditioner 400 of the automobile. The first end 10821 of the gaseous refrigerant tube 1082 is connected to the low pressure line of the air conditioner 400 of the automobile to receive the gaseous refrigerant. The second end 10822 of the gaseous refrigerant tube 1082 is connected to an input of a compressor of the air conditioner 400 of the automobile. The evaporator 108 cools the ambient air 301 passing through the air cooling chamber 104 to generate the cooled air 302.

The air conditioner 400 of the automobile has a compressor 406 for compressing the gaseous refrigerant resides in the air conditioner 400 of the automobile into a high temperature and high pressure gaseous refrigerant. The high temperature and high pressure gaseous refrigerant passes through a compressor's outlet 4064 and travels through a high-pressure lines 4066 to a condenser 4068. The condenser 4068 is similar to a small radiator, and the high temperature and high pressure gaseous refrigerant is liquefied through a heat exchanging process with atmospheric air. The liquefy refrigerant then flows through a receiver dryer 408 and a high pressure line 4082 into an expansion valve 404. The liquefy refrigerant is restricted and becomes low temperature gaseous refrigerant. The low temperature gaseous refrigerant then travels through the tubing into a cabin evaporator 402. The cabin evaporator 402 is usually located in the passenger compartment of the dash. The low temperature gaseous refrigerant is now able to absorb heat from air passing through cabin evaporator fins 4024, leaving behind cooled air. The cool air is blown by a Cabin fan 403 into the automobile's cabin.

On the other hand, the still low temperature gaseous refrigerant from the cabin evaporator 402 is connected to a low-pressure line of the gaseous refrigerant tube 1082 of the evaporator 108 (a second evaporator) housed in the air cooling chamber 104 of the air cooling chamber assembly 100. The low temperature gaseous refrigerant continues its flow through the finned-tube 1084 and returns to a low pressure inlet 4062 of the compressor 406 via the second end 10822 of the gaseous refrigerant tube 1082 of the evaporator 108.

The gaseous refrigerant flowing back to the compressor 406 will be compressed back into the high-pressure and high temperature gaseous refrigerant and the cooling process repeats. While cold gaseous refrigerant passes through the finned-tube 1082 of the evaporator 108, and through a heat exchange process, it lowers the temperature of the intake ambient air 301 that sucked in through the first end 1021 of the air intake duct 102, passes the finned-tube 1084.

The cooled air 302 becomes high density air, and the high density air carries increased amount of oxygen molecules. The high density cooled air 302 is then directed to an air-filter unit 204 through the air output duct 106 before providing this high density cooled air 302 to the internal combustion engine 200 of the automobile.

In certain embodiments, the air output duct 106 connecting the air cooling chamber assembly 100 to the air filter 204 is shielded by one or more thermal shield materials to shield the heat from the internal combustion engine 200 and maintain low temperature of the cooled air 302 in an engine compartment of the internal combustion engine 200. In certain embodiments, the thermal shield materials include thermal sleeving, thermal barriers, and/or thermal wraps. In other embodiments, the thermal shield materials include solid steel heat shield, aluminum heat shield, and/or ceramic thermal barrier coated heat insulation materials. These thermal shield materials are very important, and the air cooling chamber assembly 100 may not work properly without these thermal shield materials.

In certain embodiments, air density of the cooled air 302 from the air cooling chamber 104 is increased due to a cooling process inside the air cooling chamber assembly 100. High density cooled air 302 from the air cooling chamber 104 contains increased amount of oxygen molecules, and the increased amount of oxygen molecules in the high density cooled air 302 improves the fuel efficiency and reduces greenhouse gas emission of the internal combustion engine 200 of the automobile.

In certain embodiments, the air cooling chamber assembly 100 as described above has been tested in a laboratory and road tests. The lab test results are shown below:

1. At 1500-3000 rpm, vehicle torque is increased by an average 6.0% to 19.59%.
2. At speed between 10-110 KM/H, an average of:
   a. 16.19% fuel saving for L transmission setting;
   b. 15.57% fuel saving for $2^{nd}$ transmission setting;
   c. 12.97% fuel saving for $3^{rd}$ transmission setting; and
   d. 6.70% fuel saving for D transmission setting, respectively.
3. Greenhouse gas CO2 show an average 1.3% reduction.
4. The added air cooling chamber assembly 100 causes Nitrogen Oxides (NOx) emission reduction at L, $2^{nd}$, and D transmission settings, comparing to standard vehicle without the air cooling chamber assembly 100. The positive effect is due to the air intake temperature of the engine becoming lower, which decreases the peak temperature of the engine's combustion chamber.

In one road test, an air cooling chamber assembly 100 is installed in a long-haul truck. The air conditioner of the truck is modified and used to cool the air cooling chamber assembly 100. Prior to the installation of the air cooling chamber assembly 100, a benchmark fuel consumption level is established by a five months period and the benchmark average fuel consumption is shown in FIG. 4. Table 1 shows that the original test vehicle traveled 32,690 kilometers (KM) or 20,312 miles (M) and used 16,849 liters (L) or 4,451 gallons (G) of gasoline, yielding an average of 1.95 KM/L or 4.59 M/G, without the air cooling chamber assembly 100.

Once the air cooling chamber assembly 100 was installed at the end of August, 2019, the modified truck was used for three months between September through November of 2019. The modified truck traveled 21,204 kilometers (KM) or 12,554 miles (M) and used 9,530 liters (L) or 4,451 gallons (G) of gasoline, an average of 2.23 KM/L or 5.25 M/G, with the air cooling chamber assembly 100, as shown in Table 2 of FIG. 5.

Therefore, the fuel efficiency of the test vehicle having the air cooling chamber assembly 100 installed is improved by an average 0.28 KM/L, or an average of 14.4% improvement in fuel efficiency.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. An air cooling chamber assembly, comprising:
   an air intake duct for receiving ambient air outside of an internal combustion engine;
   an air cooling chamber for cooling the ambient air received from the air intake duct to generate cooled air, wherein the air cooling chamber comprises an evaporator, and the evaporator is connected in serial to a low pressure line of an airconditioning unit to utilize cooling power of the airconditioning unit; and
   an air output duct for providing the cooled air generated from the air cooling chamber to the internal combustion engine,
   wherein, the air cooling chamber assembly is connected to an engine air intake of the internal combustion engine to cool the ambient air to generate the cooled air prior to entering the internal combustion engine, and to provide the cooled air generated to the engine air intake of the internal combustion engine.

2. The air cooling chamber assembly of claim 1, wherein the air intake duct comprises:
   a first end, wherein the first end receives the ambient air, and an opposite, second end, wherein the second end provides the ambient air to the air cooling chamber.

3. The air cooling chamber assembly of claim 2, wherein the air output duct comprises:
a first end, wherein the first end receives the cooled air from the air cooling chamber, and
an opposite, second end, wherein the second end provides the cooled air received to the engine air intake of the internal combustion engine.

4. The air cooling chamber assembly of claim 3, wherein the air output duct is shielded by one or more thermal shield materials to maintain low temperature of the cooled air in an engine compartment of the internal combustion engine.

5. The air cooling chamber assembly of claim 4, wherein the air cooling chamber comprises the evaporator, wherein the evaporator comprises:
an array of fins and a gaseous refrigerant tube having a first end and a second end,
wherein the first end of the gaseous refrigerant tube is connected to a low pressure line of the airconditioning unit to receive a gaseous refrigerant, and the second end of the gaseous refrigerant tube is connected to an input of a compressor of the airconditioning unit, and the evaporator cools the ambient air passing through the air cooling chamber to generate the cooled air.

6. The air cooling chamber assembly of claim 1, wherein air density of the cooled air from the air cooling chamber is increased due to a cooling process inside the air cooling chamber assembly.

7. The internal combustion engine of claim 6, wherein air density of the cooled air from the air cooling chamber is increased due to a cooling process inside the air cooling chamber assembly.

8. The internal combustion engine of claim 6, wherein high density cooled air from the air cooling chamber comprises increased amount of oxygen molecules, and the increased amount of oxygen molecules in the high density cooled air improves the fuel efficiency and reduces greenhouse gas emission of the internal combustion engine.

9. The air cooling chamber assembly of claim 1, wherein high density cooled air from the air cooling chamber comprises increased amount of oxygen molecules, and the increased amount of oxygen molecules in the high density cooled air improves the fuel efficiency and reduces greenhouse gas emission of the internal combustion engine.

10. An internal combustion engine, comprising:
an air cooling chamber assembly, wherein the air cooling chamber assembly comprises:
an air intake duct for receiving ambient air outside of the internal combustion engine;
an air cooling chamber for cooling the ambient air received from the air intake duct to generate cooled air, wherein the air cooling chamber comprises an evaporator, and the evaporator is connected in serial to a low pressure line of an airconditioning unit to utilize cooling power of the airconditioning unit; and
an air output duct for providing the cooled air generated from the air cooling chamber to the internal combustion engine,
wherein, the air cooling chamber assembly is connected to an engine air intake of the internal combustion engine to cool the ambient air to generate the cooled air prior to entering the internal combustion engine, and to provide the cooled air generated to the engine air intake of the internal combustion engine.

11. The internal combustion engine of claim 10, wherein the air intake duct comprises:
a first end, wherein the first end receives the ambient air, and
an opposite, second end, wherein the second end provides the ambient air to the air cooling chamber.

12. The internal combustion engine of claim 11, wherein the air output duct comprises:
a first end, wherein the first end receives the cooled air from the air cooling chamber, and
an opposite, second end, wherein the second end provides the cooled air received to the engine air intake of the internal combustion engine.

13. The internal combustion engine of claim 12, wherein the air output duct is shielded by one or more thermal shield materials to maintain low temperature of the cooled air in an engine compartment of the internal combustion engine.

14. The internal combustion engine of claim 13, wherein the air cooling chamber comprises the evaporator, wherein the evaporator comprises:
an array of fins and a gaseous refrigerant tube having a first end and a second end,
wherein the first end of the gaseous refrigerant tube is connected to a low pressure line of the airconditioning unit to receive a gaseous refrigerant, and the second end of the gaseous refrigerant tube is connected to an input of a compressor of the airconditioning unit, and the evaporator cools the ambient air passing through the air cooling chamber to generate the cooled air.

15. An internal combustion engine of an automobile, comprising:
an air cooling chamber assembly, wherein the air cooling chamber assembly comprises:
an air intake duct for receiving ambient air outside of the internal combustion engine of the automobile;
an air cooling chamber for cooling the ambient air received from the air intake duct to generate cooled air, wherein the air cooling chamber comprises an evaporator, and the evaporator is connected in serial to a low pressure line of an air conditioner of the automobile to utilize cooling power of the air conditioner of the automobile; and
an air output duct for providing the cooled air from the air cooling chamber to the internal combustion engine of the automobile,
wherein, the air cooling chamber assembly is connected to an engine air intake of the internal combustion engine of the automobile to cool the ambient air to generate the cooled air prior to entering the internal combustion engine of the automobile, and to provide the cooled air generated to the engine air intake of the internal combustion engine of the automobile.

16. The internal combustion engine of the automobile of claim 15, wherein the air intake duct comprises:
a first end, wherein the first end receives the ambient air, and
an opposite, second end, wherein the second end provides the ambient air to the air cooling chamber.

17. The internal combustion engine of the automobile of claim 16, wherein the air output duct comprises:
a first end, wherein the first end receives the cooled air from the air cooling chamber, and
an opposite, second end, wherein the second end provides the cooled air received to the engine air intake of the internal combustion engine of the automobile,
wherein the air output duct is shielded by one or more thermal shield materials to maintain low temperature of the cooled air in an engine compartment of the internal combustion engine of the automobile.

18. The internal combustion engine of the automobile of claim 17, wherein the air cooling chamber comprises the evaporator, wherein the evaporator comprises:
an array of fins and a gaseous refrigerant tube having a first end and a second end,
wherein the first end of the gaseous refrigerant tube is connected to a low pressure line of the air conditioner of the automobile to receive a gaseous refrigerant, and the second end of the gaseous refrigerant tube is connected to an input of a compressor of the air conditioner of the automobile, and the evaporator cools the ambient air passing through the air cooling chamber to generate the cooled air.

19. The internal combustion engine of the automobile of claim 15, wherein air density of the cooled air from the air cooling chamber is increased due to a cooling process inside the air cooling chamber assembly.

20. The internal combustion engine of the automobile of claim 15, wherein high density cooled air from the air cooling chamber comprises increased amount of oxygen molecules, and the increased amount of oxygen molecules in the high density cooled air improves the fuel efficiency and reduces greenhouse gas emission of the internal combustion engine of the automobile.

* * * * *

UNITED STATES PATENT AND TRADEMARK OFFICE
CERTIFICATE OF CORRECTION

| | |
|---|---|
| PATENT NO. | : 10,934,982 B1 |
| APPLICATION NO. | : 16/816102 |
| DATED | : March 2, 2021 |
| INVENTOR(S) | : Tan |

It is certified that error appears in the above-identified patent and that said Letters Patent is hereby corrected as shown below:

In the Claims

Please replace Claims 7 through 9, which corresponds to Column 11, Line 30 through Column 11, Line 45, with the following:

7. The air cooling chamber assembly of claim 6, wherein high density cooled air from the air cooling chamber comprises increased amount of oxygen molecules, and the increased amount of oxygen molecules in the high density cooled air improves the fuel efficiency and reduces greenhouse gas emission of the internal combustion engine.

8. An internal combustion engine, comprising:
    an air cooling chamber assembly, wherein the air cooling chamber assembly comprises:
        an air intake duct for receiving ambient air outside of the internal combustion engine;
        an air cooling chamber for cooling the ambient air received from the air intake duct to generate cooled air, wherein the air cooling chamber comprises an evaporator, and the evaporator is connected in serial to a low pressure line of an air-conditioning unit to utilize cooling power of the air-conditioning unit; and
        an air output duct for providing the cooled air generated from the air cooling chamber to the internal combustion engine,
        wherein, the air cooling chamber assembly is connected to an engine air intake of the internal combustion engine to cool the ambient air to generate the cooled air prior to entering the internal combustion engine, and to provide the cooled air generated to the engine air intake of the internal combustion engine.

9. The internal combustion engine of claim 8, wherein the air intake duct comprises:
    a first end, wherein the first end receives the ambient air, and
    an opposite, second end, wherein the second end provides the ambient air to the air cooling chamber.

Signed and Sealed this
Fifteenth Day of March, 2022

Drew Hirshfeld
*Performing the Functions and Duties of the
Under Secretary of Commerce for Intellectual Property and
Director of the United States Patent and Trademark Office*

Please replace Claims 10 through 14, which corresponds to Column 11, Line 46 through Column 12, Line 28, with the following:

10. The internal combustion engine of claim 9, wherein the air output duct comprises:
 a first end, wherein the first end receives the cooled air from the air cooling chamber, and
 an opposite, second end, wherein the second end provides the cooled air received to the engine air intake of the internal combustion engine.

11. The internal combustion engine of claim 10, wherein the air output duct is shielded by one or more thermal shield materials to maintain low temperature of the cooled air in an engine compartment of the internal combustion engine.

12. The internal combustion engine of claim 11, wherein the air cooling chamber comprises the evaporator, wherein the evaporator comprises:
 an array of fins and a gaseous refrigerant tube having a first end and a second end,
 wherein the first end of the gaseous refrigerant tube is connected to a low pressure line of the air-conditioning unit to receive a gaseous refrigerant, and the second end of the gaseous refrigerant tube is connected to an input of a compressor of the air-conditioning unit, and the evaporator cools the ambient air passing through the air cooling chamber to generate the cooled air.

13. The internal combustion engine of claim 8, wherein air density of the cooled air from the air cooling chamber is increased due to a cooling process inside the air cooling chamber assembly.

14. The internal combustion engine of claim 13, wherein high density cooled air from the air cooling chamber comprises increased amount of oxygen molecules, and the increased amount of oxygen molecules in the high density cooled air improves the fuel efficiency and reduces greenhouse gas emission of the internal combustion engine.